March 18, 1947. C. B. FISCHBACH 2,417,640
TRUCK TRAILER CHASSIS
Filed April 17, 1945 2 Sheets-Sheet 1

C. B. FISCHBACH, INVENTOR.

March 18, 1947. C. B. FISCHBACH 2,417,640
TRUCK TRAILER CHASSIS
Filed April 17, 1945 2 Sheets-Sheet 2

C. B. FISCHBACH, INVENTOR.

BY Mason Fenwick & Lawrence
Attorneys

Patented Mar. 18, 1947

2,417,640

UNITED STATES PATENT OFFICE 2,417,640

TRUCK TRAILER CHASSIS

Cecil B. Fischbach, Akron, Ohio

Application April 17, 1945, Serial No. 588,774

5 Claims. (Cl. 280—106.5)

This invention relates to chassis construction for truck trailers of that type in which the truck while being loaded is supported upon the rear wheels and auxiliary supporting means at an intermediate point, providing a rectangular supporting base with a cantilever overhang of a considerable portion of the forward part of the chassis, and which is adapted to be coupled to a tractor at its forward portion and the auxiliary supporting means relieved from their load bearing function whereby under transportation conditions the cantilever characteristic of the forward portion is removed. In a trailer chassis of this type, it is essential that the strength be adequate to support the load upon the cantilever portion, as well as that portion above the rectangular base of support.

In the interest of increasing the pay load of the truck, it is the general object of the present invention to diminish the weight of the chassis compared with that of known chassis, without decreasing its load capacity by designing the chassis and its component parts with reference to the stresses to be encountered both under conditions of loading and of transportation.

Other objects of the invention will appear as the following description of a preferred and practical embodiment thereof proceeds.

In the drawings which illustrate the invention and throughout the figures of which the same reference characters have been used to denote identical parts:

Figure 1:
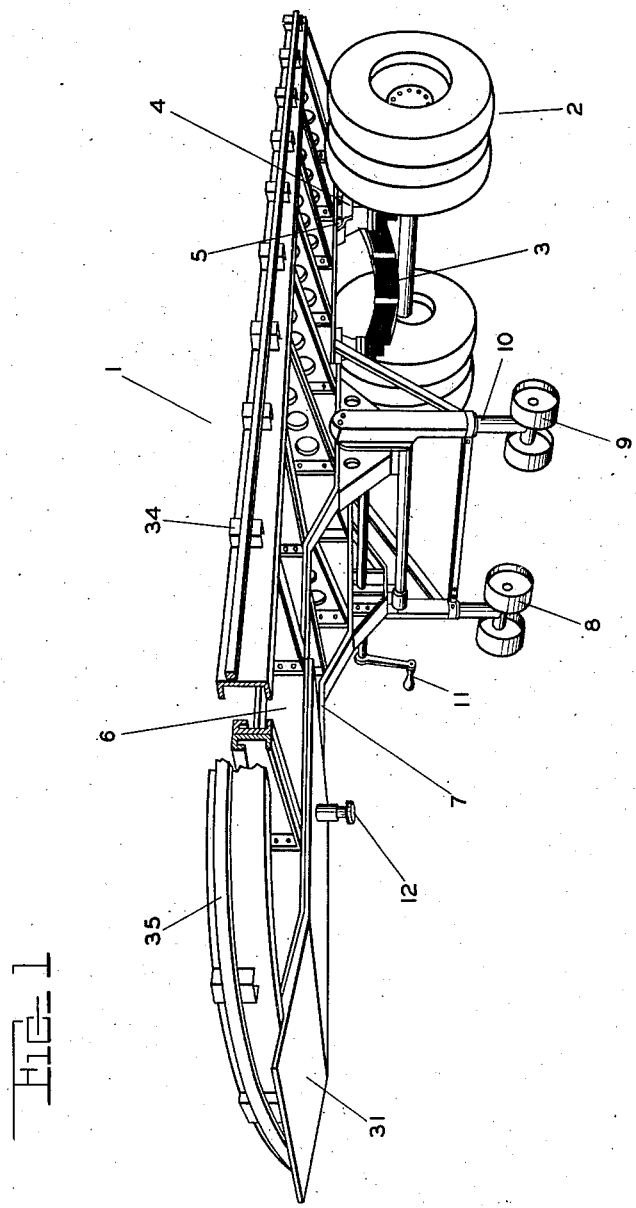
Figure 1 is a perspective view of a truck trailer embodying the principles of the invention, a portion being cut away to show the cross-sectional shape of the peripheral rim.

Referring now in detail to the several figures, and first to Figure 1, the trailer comprises a chassis 1, supported by the rear wheels 2 through the intermediary of longitudinal leaf springs 3, the seats 4 at the ends of the springs being bolted to depth extensions 5 of the longitudinal members 6 and 7 of the chassis. The chassis is supported at an intermediate point while being loaded by the dolly wheels 8 and 9 carried by a vertically reciprocable frame 10, which may be operated by a crank 11 or equivalent means for lifting the dolly wheels from the ground and carrying them in an elevated position when the front end of the trailer is supported by the tractor, not shown. When in the loading position shown in Figure 1, a large part of the forward end of the chassis overhangs the base of support afforded by the rear wheels and dolly wheels, having the characteristics of a cantilever. The forward or cantilever portion of the chassis must be made as shallow, depthwise, as possible, to provide clearance for the tractor which is back beneath the forward portion of the chassis in coupling position. A king bolt 12 is shown, by means of which the trailer and tractor are pivotally coupled. The dolly wheels and the means for elevating or lowering them is not a part of the present invention, which is devoted to the problem of providing a chassis construction of minimum weight and at the same time capable of adequately bearing the load imposed upon it under loading conditions and during transportation.

Figure 2:
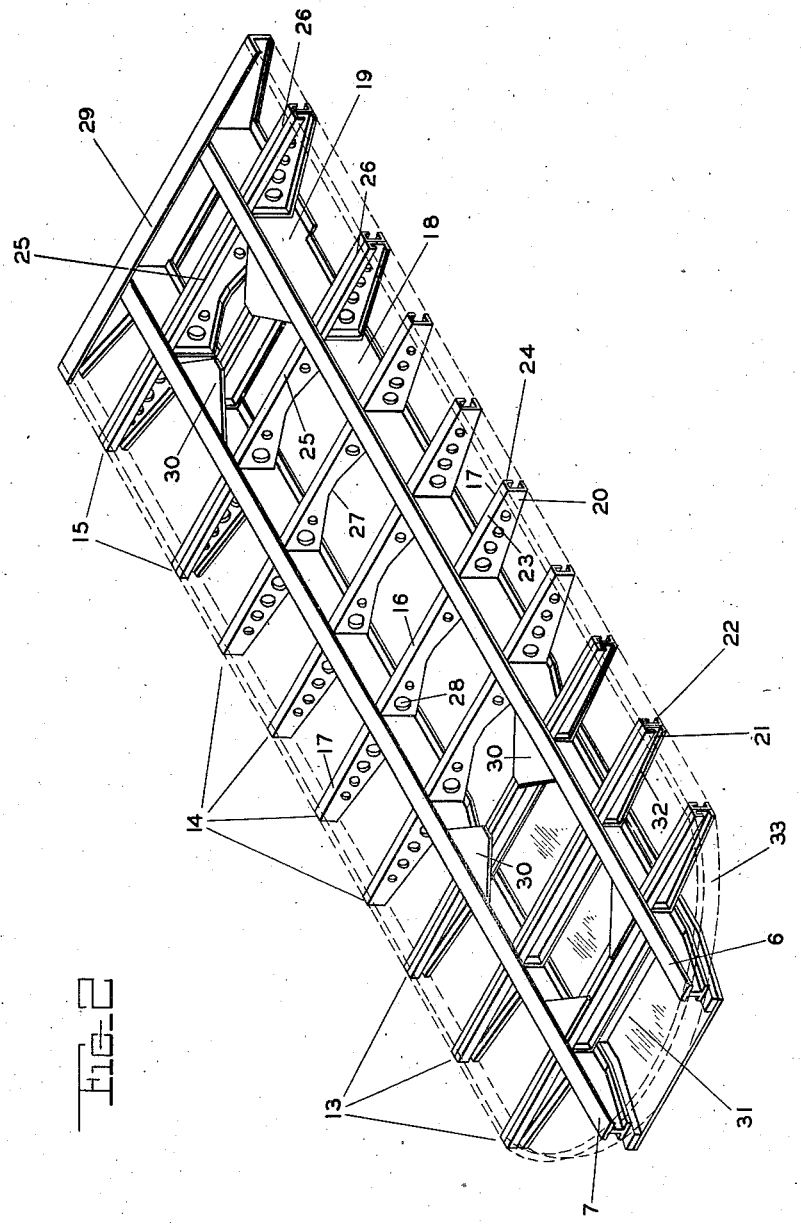
Figure 2 is a perspective view of the chassis frame, the rim being indicated in broken lines.

Now, adverting to the details of construction shown in Figure 2, the chassis consists essentially of the longitudinal beams 6 and 7 and the cross beams which form definite groups, the first or forward group being designated as a whole by the reference character 13, the intermediate group by the reference character 14, and the rear group, that is to say, those beams which overlie the rear springs, being designated by the reference character 15.

Since the bending strength of a beam varies inversely as the square of its length, the effective span of the cross beams is reduced by positioning the longitudinal beams 6 and 7 relatively close, as shown, the transverse beams being thus divided into three parts, a middle span 16, which extends between the longitudinal beams and is secured thereto at both ends, and cantilever end portions 17 on the outside of the longitudinals and secured thereto at their adjacent ends. In this manner, the transverse beams are supported at two points intermediate their length and a much lighter beam is adequate to support a given load.

The longitudinal beams are preferably of I cross-section. In the course of their length, the depth of the longitudinal beams varies, being relatively shallow in the forward or cantilever portion of the chassis, to give maximum room for the tractor, and being relatively deep at the points 18 and 19 to which the rear spring seats are secured, to resist vertical impact shocks produced when the rear wheels encounter bumps in the road. The intermediate portions of the longitudinals is of average depth adequate to support the load.

The cross beams are of conventional cross-section, being either single channel bars 20 or fabricated of double channels 21 and 22 with their webs in contact. Preferably, strength of the upper flange 23 of the channels is augmented by the presence of downwardly extending side flanges 24 parallel to the webs, such forms having a wide use in airplane wing structure.

Referring now to the forward or cantilever portion of the chassis, since the cross beams 13 cannot be of any greater depth than the relatively shallow depth of the longitudinals to which they are secured, they are made relatively strong by being fabricated of two channels, back to back, and the lightening apertures are omitted from their webs. Those cross beams 14 which lie in the intermediate part of the chassis where the longitudinals are of greater depth, are made the full depth of the longitudinals at their points of attachment thereto and are constructed of a single channel beam. Since the center of an arc derives its strength from the immobility of its buttresses, the relatively great depth at the ends of the middle spans of these intermediate beams permits them to be made progressively narrower toward the middle, as indicated at 27, without undue sacrifice of strength, and, referring back to the beams at the cantilever portion of the chassis, it is because they are of relatively shallow depth at their juncture with the longitudinals, that the full depth of the middle spans is retained throughout their length.

Now, with reference to the cross beams 15, which lie in that portion of the chassis above the rear springs, these are subjected to vertical shock movements of greater amplitude than the other cross beams, and therefore are required to be stronger in certain parts. The middle spans 25 of these beams being supported at both ends by the longitudinals are amply strong when made of a single channel, but the cantilever end portions 26 which is supported at only one end are formed of double channels arranged web to web.

All of the cross members back of the forward or cantilever portion of the chassis may be provided with the lightening apertures 28.

The chassis is terminated at the rear by a single cross beam 29 of channel cross-section, which embraces the ends of the longitudinals, the latter being fixed thereto. This being an end beam, carries but little load and therefore may be relatively light and consists of a single channel, as shown. Its chief function is to resist tortional stresses between the longitudinals, set up for example, when the load sways as the truck turns a curve.

At desired points the chassis is reinforced by the usual gusset plates 30, and at the front it is found reinforced by the guide plate 31, provided primarily as a guide against which the tractor may slide to coupling position. This plate is rigidly secured both to the longitudinals and the overlying cross beams.

The cantilever extensions 32 of all the cross beams taper toward their free ends in conventional manner and are held against tortional and lateral deflection by being secured to a peripheral U-shaped rim member 33 of channel cross-section with curved front which circumscribes the front of the chassis, and with the ends of its legs secured to the rear beam 29.

The front of the rim member is secured to the front ends of the longitudinals, as well as to the guide plate. At appropriate intervals, stake sockets 34, see Figure 1, are secured to the outer side of the rim member, and a fender band 35, see Figure 1, surrounds the rim member 33, encompassing the stake sockets 34, and being secured thereto. Thus, the rim member, stake sockets and fender band constitute a peripheral girder rigidly reinforcing the entire chassis frame.

In the preferred embodiment of the invention herein illustrated and described, the members of the chassis are secured by welding. It is within the purview of the invention to employ any other means of securement.

It will be understood to those skilled in the art that a chassis constructed according to the principles of this invention combines adequate strength, with minimum weight, and thus makes possible a saving in dead weight with corresponding increase in pay load.

What I claim as my invention is:

1. Truck trailer chassis comprising a frame, road wheels at the rear supporting said chassis through the intermediary of longitudinal leaf springs having bearing supports at their ends against said frame, means for supporting said chassis at an intermediate point while being loaded, defining with said bearing supports a rearward portion of said frame supported at both ends and a forward cantilever portion, said frame comprising a pair of longitudinal beams and a series of parallel spaced cross beams secured thereto, said longitudinal beams intersecting the cross beams at intermediate points in the length of said cross beams whereby the latter are divided into middle portions spanning the distance between the cross beams, and cantilever end portions, said longitudinal beams being of shallower depth in said forward cantilever portion than in said rearward portion, the cross beams in each of said portions being substantially the full depth of the longitudinals at their respective points of attachment thereto, the cross beams in said rearward portion forward of said bearing supports being formed of a single channel member, the cross beams in said forward cantilever portion being each formed of two channel members arranged web to web, there being cross beams above said bearing supports spaced relatively wide apart to give wheel clearance, the cantilever end portions of said last named cross beams being formed of two channel members arranged web to web.

2. Truck trailer chassis comprising a frame, road wheels supporting said chassis at the rear and means for supporting said chassis at an intermediate point while being loaded, defining with said road wheels a rearward portion of said frame supported at both ends and a forward cantilever portion, said frame comprising a pair of longitudinal beams and a series of parallel spaced cross beams secured thereto, said longitudinal beams intersecting the cross beams at intermediate points in the length of said cross beams whereby the latter are divided into middle portions spanning the space between the cross beams, and cantilever end portions, said longitudinal beams being of shallower depth in said forward cantilever portion than in said rearward portion, the cross beams in each of said portions being substantially the full depth of the longitudinal beams at their respective points of attachment thereto, the cross beams in said rearward portion being formed of a single channel member and the cross beams in said forward portion being each formed of two channel members arranged web to web, a rim channel embracing the front and sides of said frame, secured to the forward ends of said longitudinal beams and the outer ends of said cross beams, and a transverse guide plate on the under side of said frame of a width equal at least to the distance between said longitudinal beams, extending longitudinally from said rim beneath at least two of said cross beams, said guide plate being rigidly secured to said longitudinal beams and the cross beams which it underlies.

3. Truck trailer chassis comprising a frame, road wheels supporting said chassis at the rear and means for supporting said chassis at an intermediate point while being loaded, defining with said road wheels a rearward portion of said frame supported at both ends and a forward cantilever portion, said frame comprising a pair of longitudinal beams and a series of parallel spaced cross beams secured thereto, said longitudinal beams intersecting the cross beams at intermediate points in the length of said cross beams whereby the latter are divided into middle portions spanning the space between the cross beams, and cantilever end portions, said longitudinal beams being of shallower depth in said forward cantilever portion than in said rearward portion, the cross beams in each of said portions being substantially the full depth of the longitudinal beams at their respective points of attachment thereto, the cross beams in said rearward portion being formed of a single channel member and the cross beams in said forward portion being each formed of two channel members arranged web to web, a rim channel embracing the front and sides of said frame, secured to the forward ends of said longitudinal beams and the outer ends of said cross beams, and a transverse guide plate on the under side of said frame of a width equal at least to the distance between said longitudinal beams, extending longitudinally from said rim beneath at least two of said cross beams, said guide plate being rigidly secured to said longitudinal beams and the cross beams which it underlies, and coupling means extending from said guide plate.

4. Truck trailer chassis comprising a frame, road wheels supporting said chassis at the rear and means for supporting said chassis at an intermediate point while being loaded, defining with said road wheels a rearward portion of said frame supported at both ends and a forward cantilever portion, said frame comprising a pair of longitudinal beams and a series of parallel spaced cross beams secured thereto, said longitudinal beams intersecting the cross beams at intermediate points in the length of said cross beams whereby the latter are divided into middle portions spanning the space between the cross beams, and cantilever end portions, said longitudinal beams being of shallower depth in said forward cantilever portion than in said rearward portion, the cross beams in each of said portions being substantially the full depth of the longitudinal beams at their respective points of attachment thereto, the cross beams in said rearward portion being formed of a single channel member and the cross beams in said forward portion being each formed of two channel members arranged web to web, a rim channel embracing the front and sides of said frame, secured to the forward ends of said longitudinal beams and the outer ends of said cross beams, stake sockets fixed at intervals to the outer side of said rim channel, a fender strip encompassing said rim channel and sockets, secured to the latter, a transverse guide plate in the under side of said frame of a width equal at least to the distance between said longitudinal beams, extending longitudinally from said rim beneath at least two of said cross beams and rigidly secured to said longitudinal beams and the cross beams which it underlies.

5. Truck trailer chassis comprising a frame, road wheels at the rear supporting said chassis through the intermediary of longitudinal leaf springs having bearing supports at their ends against said frame, means for supporting said chassis at an intermediate point while being loaded, defining with said bearing supports a rearward portion of said frame supported at both ends, and a forward cantilever portion, said frame comprising a pair of longitudinal beams and a series of parallel spaced cross beams secured thereto, said longitudinal beams intersecting the cross beams at intermediate points in the length of said cross beams whereby the latter are divided into middle portions spanning the distance between the cross beams, and cantilever end portions, said longitudinal beams being of shallower depth in the forward cantilever portion than in said rearward portion, the cross beams in each of said portions being substantially the full depth of the longitudinals at their respective points of attachment thereto, the cross beams in said rearward portion forward of said bearing supports being formed of a single channel member, the cross beams in said forward cantilever portion being each formed of two channel members arranged web to web, a rim channel embracing the front and sides of said frame secured to the forward ends of said longitudinal beams and the outer ends of said cross beams, and a transverse guide plate on the under side of said frame of a width equal at least to the distance between said longitudinal beams, extending longitudinally from said rim beneath at least two of said cross beams, said guide plate being rigidly secured to said longitudinal beams and the cross beams which it underlies.

CECIL B. FISCHBACH.

REFERENCES CITED

The following references are of record in the file of this patent:

UNITED STATES PATENTS

| Number | Name | Date |
|---|---|---|
| 1,243,255 | Campbell | Oct. 16, 1917 |
| 2,112,334 | Van Doorne | Mar. 29, 1938 |
| 776,175 | Dodds | Nov. 29, 1904 |
| 1,248,037 | Thompson et al. | Nov. 27, 1917 |
| 1,946,520 | Blomberg et al. | Feb. 13, 1934 |

FOREIGN PATENTS

| Number | Country | Date |
|---|---|---|
| 540,253 | French | July 8, 1922 |